US006817109B2

(12) United States Patent
Wong et al.

(10) Patent No.: US 6,817,109 B2
(45) Date of Patent: Nov. 16, 2004

(54) APPARATUS AND METHOD FOR MEASURING CIRCULARITY OF CIRCULAR PARTS

(75) Inventors: Kin Y. Wong, Renton, WA (US); Stanley W. Richardson, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/286,052

(22) Filed: Nov. 1, 2002

(65) Prior Publication Data

US 2004/0083619 A1 May 6, 2004

(51) Int. Cl.⁷ .................................................. G01B 5/10
(52) U.S. Cl. ....................................... 33/550; 33/555.1
(58) Field of Search ........................... 33/549, 550, 783, 33/784, 803, 810, 811, 812, 832, 833, 555.1

(56) References Cited

U.S. PATENT DOCUMENTS

| | | | | |
|---|---|---|---|---|
| 1,346,304 A | * | 7/1920 | Donaldson | 33/803 |
| 1,510,285 A | * | 9/1924 | Lustenberger | 33/812 |
| 2,807,091 A | * | 9/1957 | Michelson | 33/519 |
| 3,648,377 A | * | 3/1972 | Witzke | 33/560 |
| 4,958,442 A | * | 9/1990 | Eckhardt | 33/783 |
| 5,148,611 A | * | 9/1992 | Raetzel | 33/783 |
| 5,148,612 A | * | 9/1992 | Walser et al. | 33/784 |
| 5,177,875 A | * | 1/1993 | Pienta | 33/803 |
| 5,369,890 A | * | 12/1994 | Malz | 33/810 |
| 5,383,283 A | * | 1/1995 | Olsen et al. | 33/555.1 |

OTHER PUBLICATIONS

Publication from Qinhai Measuring & Cutting Tools Co., Ltd.
"Measurement of Out–Of–Roundness"; American National Standard.
"Welcome to The Master of Measurement".
Publication regarding different types of measuring devices; CEJ —Trading.
Picture from Internet of Measurement Indicator Device; Aug. 9, 2002.

* cited by examiner

Primary Examiner—Christopher W. Fulton
Assistant Examiner—Amy R. Cohen
(74) Attorney, Agent, or Firm—Harness Dickey & Pierce P.L.C.

(57) ABSTRACT

A measurement device and apparatus for measuring the out-of-roundness of a circular part. The apparatus includes a base on which a travel assembly is mounted within an elongated channel formed in the base. A recirculating ball bearing slide assembly is operatively coupled to a flat strip force spring, which is in turn coupled to ball bearing slide assembly, and which provides a constant contact force, regardless of distance, to bias the travel assembly into a 90-degree corner portion of the base assembly. A generally circular part is placed in the 90-degree corner and manually rotated while the travel assembly is in contact with an outer surface thereof. The linear movement of the travel assembly is detected by a measurement device which provides an indication of the out-of-roundness of the part.

12 Claims, 4 Drawing Sheets

APPARATUS AND METHOD FOR MEASURING CIRCULARITY OF CIRCULAR PARTS

FIELD OF THE INVENTION

The present invention generally relates to measurement devices, and more particularly to a measurement device for measuring non-circularity of a generally circular part and providing an indication of non-circularity of the part.

BACKGROUND OF THE INVENTION

It is often necessary to measure the non-circularity of a generally circular part. This is important because an unacceptable degree of non-circularity of a part can affect how that part couples with other parts or otherwise performs when assembled to other parts.

One present method for determining the degree of non-circularity of a generally circular part is by using calipers to measure the outer diameter of the part or of various structural portions, such as a flange, of a circular part. Using calipers is difficult and does not always provide the degree of accuracy desired. Also, circular parts of significantly varying diameters may require the use of different calipers, which further introduces inconsistencies into the circularity measuring process.

One particular type of gauge used for determining the out-of-roundness of a circular part is a slide gauge. The slide gauge typically consists of a graduated member with a fixed jaw and a sliding member also with a jaw. However, these types of gauges suffer from various limitations due to the construction of the jaws typically used, which can limit the variation in diameter of the parts which can be checked.

Another method for measuring out-of-roundness involves making a diameter measurement through a common, cross-sectional plane, such as those made by a micrometer, bore gauge or comparator stand. These two-point measurement methods are not considered to yield especially accurate out-of-roundness values. This method is typically used in comparison tests where functional or performance criteria have been related to geometric conditions based on a particular roundness measurement.

Yet another method for measuring out-of-roundness is by evaluating a typical cross-sectional profile of a part in terms of its radial deviations from a defined center of the part. This method typically involves the use of a stylus which is placed in contact with the part surface, for example, a horizontal lathe roundness measurement tool. An appropriate stylus force is used to maintain adequate contact with the part surface. The force used depends on the hardness, flexibility, and the maximum compressive strength of the part material itself, as well as the rotational speed and mass of the stylus assembly and the stylus tip radius.

Still another method for measuring out-of-roundness involves the use of a V-shaped block which receives the part to be measured. A stylus is used to then make out-of-roundness measurements with the part.

Still further forms of out-of-roundness measuring involve image processing techniques where an image of the part is made, electronically processed, and quantified using image processing algorithms. Proprietary gauges are also used which rely on multiple cord measurements of a part. Adjustable screw engages have been used in which the part being checked is placed inside of a ring and the diameter of a part is measured relative to the inner diameter of the ring.

All of the above methods have limitations relating to either accuracy or the complexity of the tool required to perform the out-of-roundness measurement. Therefore, the need exists for a relatively simple, accurate, out-of-roundness detection tool that can be used with generally circular parts having a wide variety of diameters which accurately indicate a degree of out-of-roundness of a circular part.

SUMMARY OF THE INVENTION

The present invention is directed to a measurement device and method for detecting the out-of-roundness of a circular part or work piece. The apparatus comprises a base assembly having an elongated channel formed therein. A travel or follower assembly providing a constant part contact force is operatively coupled in the channel, and also operatively coupled to a recirculating ball bearing and rail assembly which operates to move the travel assembly along the elongated channel. A measurement device is also operatively coupled to the travel assembly and provides a measurement indication depending upon movement of the travel assembly.

To test the circularity or out-of-roundness of a circular part, the part is placed within a corner of the base. The travel assembly is abutted against a surface of the circular part and the part is then rotated. The greater the degree of out-of-roundness of the circular part, the greater the degree of movement of the travel assembly. This movement is detected by the measurement device which provides an indication of the out-of-roundness to a user.

In one preferred form, the base includes a 90-degree corner portion within which the circular part is placed. The base also includes an elongated channel formed therein within which a portion of the travel assembly moves slidably. The apparatus is relatively simple and inexpensive to construct and can accommodate parts having a considerable variation in diameter.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a plan view of the apparatus with a circular part positioned thereon for testing.

DETAILED DESCRIPTION OF THE PREFERRED EMBODIMENTS

The following description of the preferred embodiment(s) is merely exemplary in nature and is in no way intended to limit the invention, its application, or uses.

Figure 1:
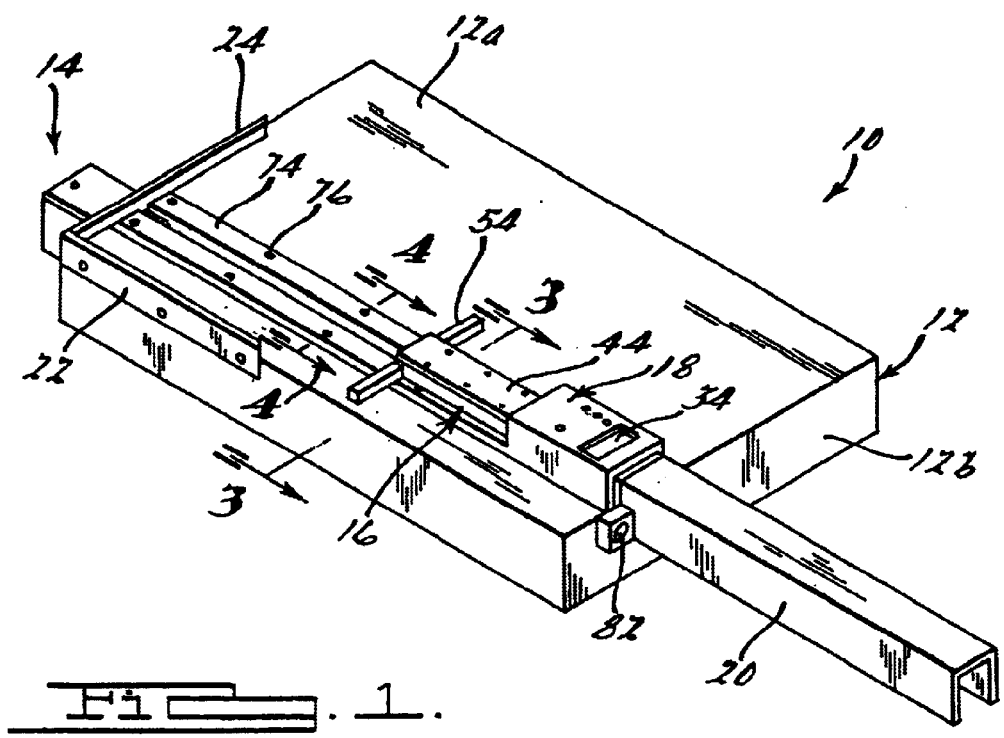
FIG. 1 is a perspective view of a measurement device in accordance with a preferred embodiment of the present invention.

Referring to FIG. 1, there is shown a measurement device 10 in accordance with a preferred embodiment of the present invention. As will be described further, the measurement apparatus 10 is able to easily and accurately determine the out-of-roundness or non-circularity of generally circular parts.

The apparatus 10 generally comprises a base assembly 12 which houses a constant contact spring force device 14. The spring force device 14 is operatively coupled to a travel assembly 16. A measurement device 18 is also fixedly coupled to the base assembly 12. An inverted U-shaped member 20 forms a protective covering for a portion of the measurement device 18. Corner members 22 and 24 form a generally 90-degree corner against which a circular part may be placed on an upper surface 12a of a base member 12b of the base assembly 12.

Figure 2:
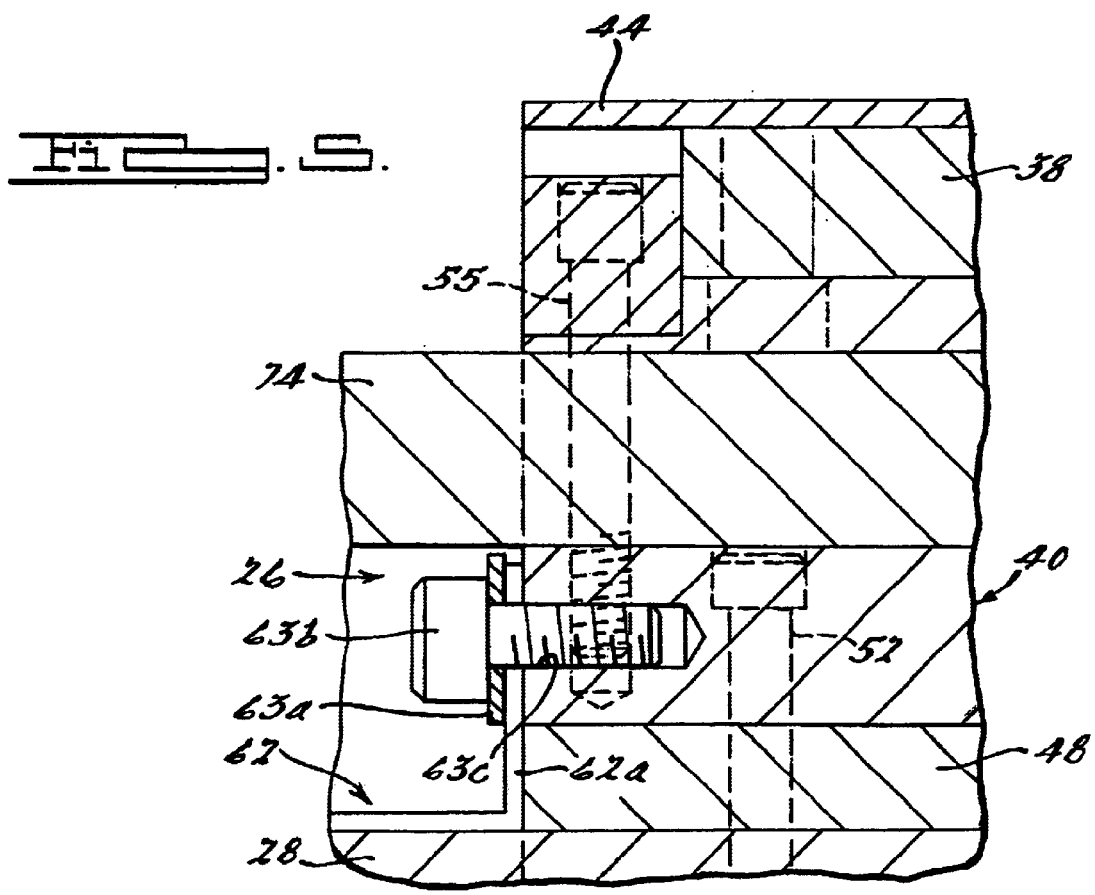
FIG. 2 is an exploded perspective view of the measurement device of FIG. 1.
Figure 2:
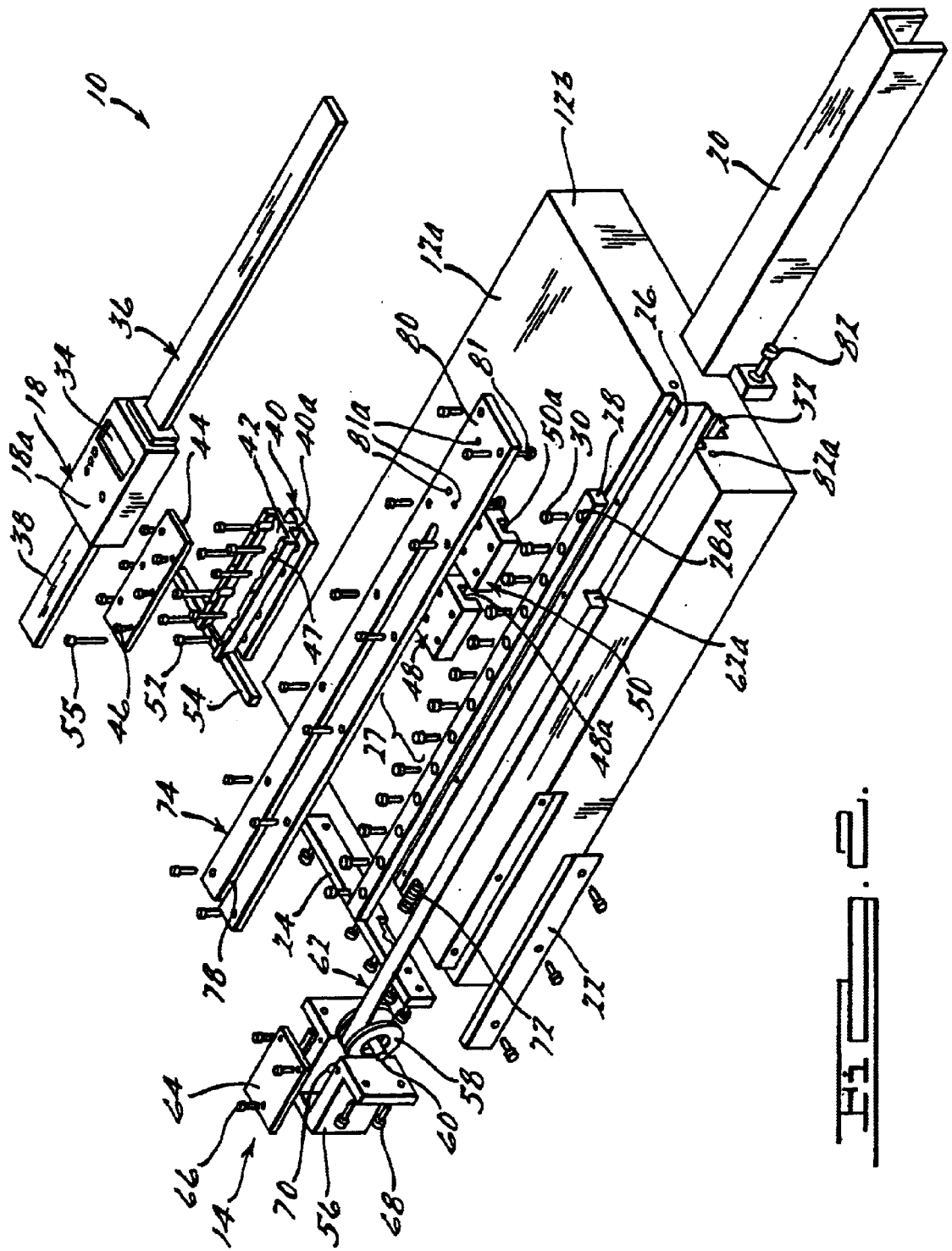

Referring to FIG. 2, the independent component parts of the measurement apparatus 10 can be seen in greater detail. The base assembly 12 further comprises an elongated, linear channel 26 into which is mounted a ball bearing slide assembly 27. The assembly 27 includes a guide rail 28 and bearing carriages 48 and 50. The bearing carriages 48 and 50 are commercially available as a complete assembly. The guide rail 28 is secured by a plurality of fastening elements 30, such as threaded fasteners, that extend through holes 28a into threaded holes (not shown) in a notched portion 32, such that the guide rail 28 is centered within the notched portion 32 in a bottom of the channel 26.

With further reference to FIG. 2, the measurement device 18 may comprise a variety of suitable devices for detecting very small degrees of linear movement. In one preferred form, the measurement device 18 comprises an electronic measurement device (i.e., digital scale) manufactured by Mitutoyo Corporation, and available as model number SDV-12" A (code 572-333), and includes a digital readout 34 for providing an indication of the out-of-roundness of a part being checked with the apparatus 10.

With further reference to FIG. 2, the measurement device 18 includes an elongated member 36 which is adapted to move slidably linearly. Portion 38 thereof is clamped to an I-beam member 40 of the travel assembly 16 between an upper surface 42 of the I-beam member 40 and a cover plate 44 by a plurality of threaded fasteners 46. The fasteners 46 extend into threaded holes 47 in the I-beam member 40. Thus, movement of the travel assembly 16 linearly along the channel 26 in the housing assembly 12 causes a corresponding linear movement of portion 38 of the measurement device 18.

Figure 3:
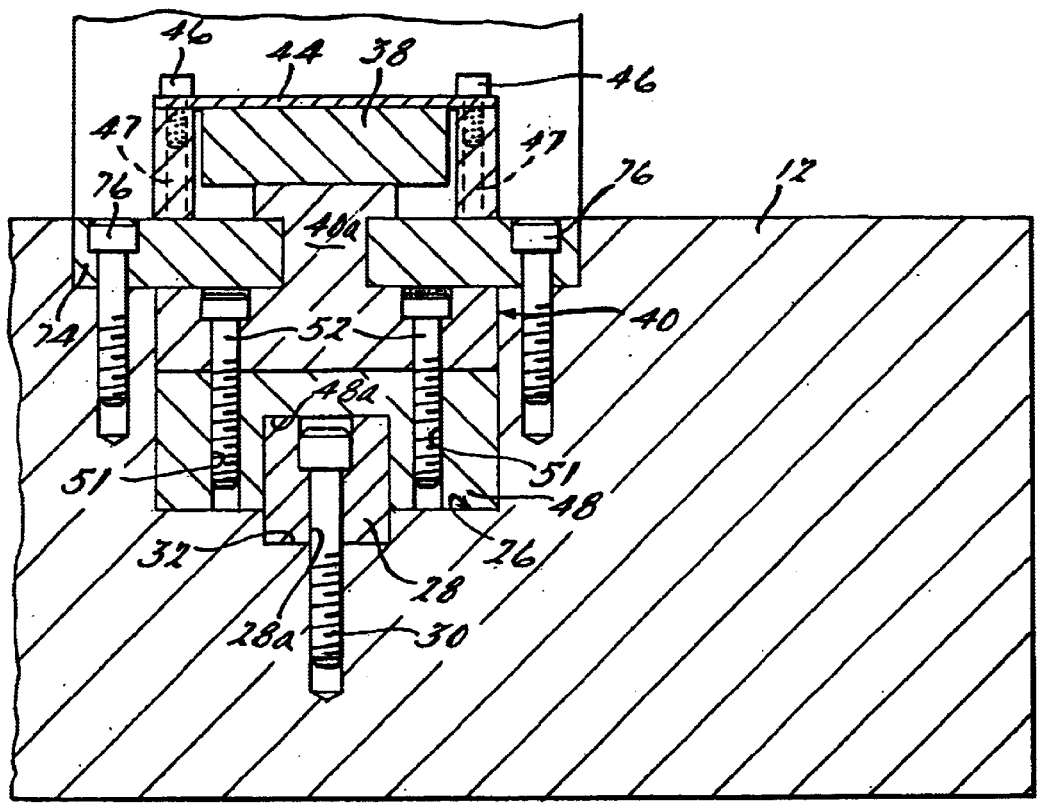
FIG. 3 is a cross-sectional end view taken in accordance with section line 3—3 in FIG. 1 illustrating the travel assembly disposed within the elongated channel of the base.

Referring to FIGS. 2 and 3, the I-beam member 40 is secured to the pair of bearing carriages 48 and 50 operatively associated with the rail 28 via threaded fasteners 52 through threaded apertures 51. The bearing carriages 48 and 50 each have grooves 48a and 50a formed therein such that same are able to slide along the guide rail 28. The overall dimensions of the bearing carriages 48 and 50 are further such that they are able to fit completely within the channel 26. Finally, a travel bar 54, set up parallel to corner member 24, is secured via a threaded screw 55 to the I-beam member 40, as also shown in FIG. 3. The travel bar 54 provides a contact surface which a portion of the outer surface of a circular part abuts against once the part is positioned on the base assembly 12 against corner members 22 and 24.

Figure 5:
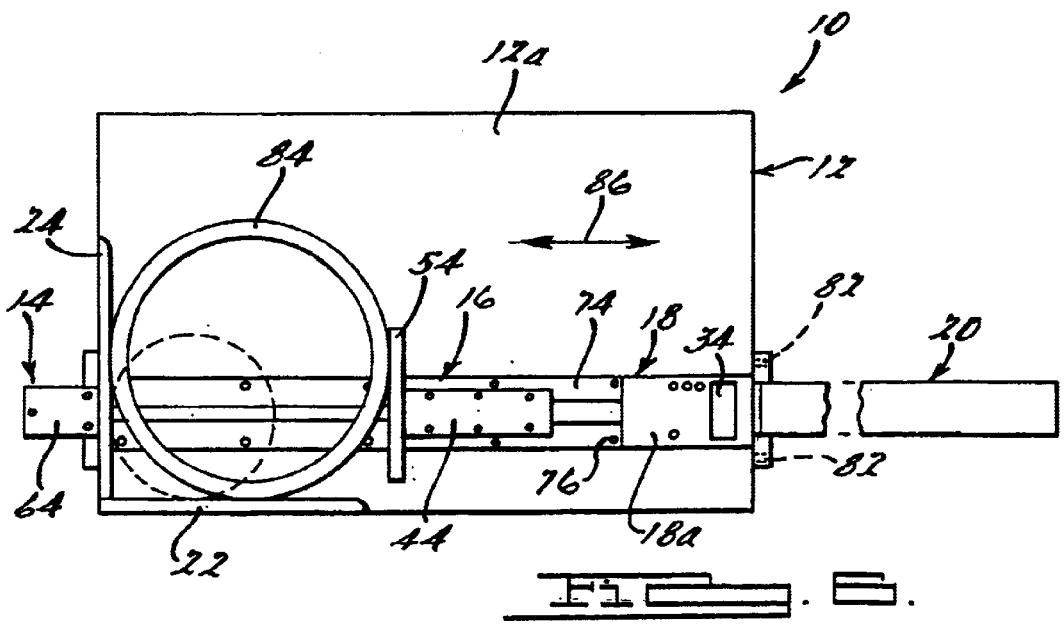
FIG. 5 is a cross-sectional side view of a portion of the travel assembly taken along section line 5—5 in FIG. 4.
Figure 4:
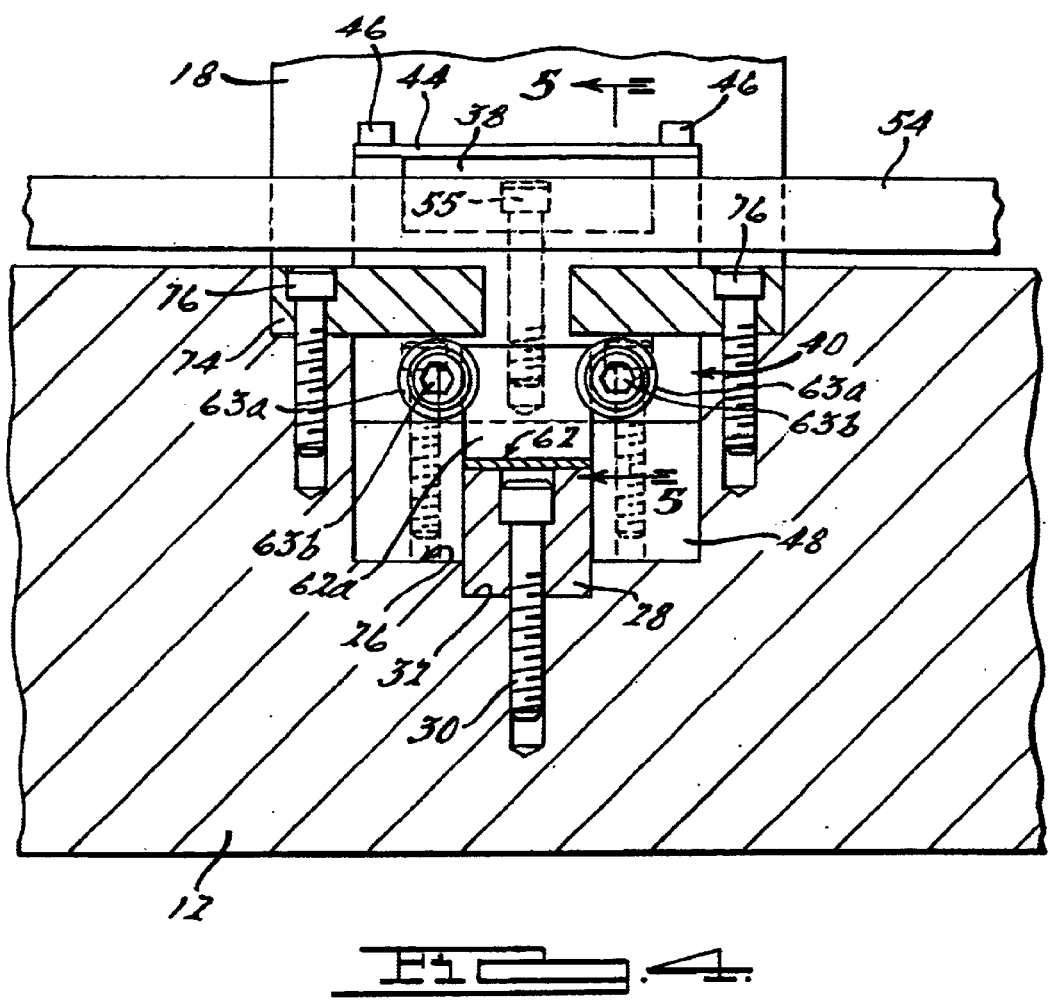
FIG. 4 is a cross-sectional end view of a portion of the travel assembly taken along section line 4—4 in FIG. 1.

With further reference to FIG. 2, the spring force device 14 includes a support bracket 56 which supports a force spring roller 58 via a pin 60. Secured to the force spring roller 58 is one end of a flat strip coiled spring 62. A cover 64 is secured to the support bracket 56 via a plurality of threaded fasteners 66, and the support bracket 56 is secured to the base assembly 12 by plurality of threaded fasteners 68. The force spring roller 58 is able to move rotationally on the support pin 60 within a corresponding pair of aligned apertures 70 (only one being visible in FIG. 2) in the support bracket 56. The opposite end of the coil spring 62 is coupled to the I-beam member 40 via upturned end 62a. With reference to FIGS. 4 and 5, the upturned end is secured to the I-beam member 40 by a pair of washers 63a secured via threaded fasteners 63b extending into threaded bores 63c (note FIG. 5) in the bearing carriage 48.

The flat strip coiled spring 62 provides a biasing force which tends to constantly bias the travel assembly 16 towards the corner member 24, and thus maintains the travel bar 54 in constant contact with the outer surface of a circular part positioned against the corner members 22 and 24 on the base assembly 12. A return spring 72 is also positioned in the channel 26 just above the guide rail 28, and against corner member 24, to provide a cushioned stop for the travel assembly 16 should a circular part be removed from the base assembly 12 while the travel assembly 16 is in contact with the part.

With further reference to FIGS. 1–3, a travel plate 74 is secured over the channel 26 by a plurality of threaded fasteners 76. The travel plate 74 has a slot 78 formed therein which receives the vertical portion 40a of the I-beam member 40 therein when the travel assembly 16 is coupled to the base assembly 12. The I-beam member 40 is thus able to move slidably, linearly along the channel 26 without interference from the travel plate 74. The travel plate 74 further substantially encloses the channel 26 to prevent dirt and other debris from entering the channel. The measurement device 18 is fixedly secured to an end portion 80 of the travel plate 74 via threaded screws 81 which extend through holes 81a in the travel plate 74 and into a housing 18a of the measurement device 18. The cover 20 is secured via a pair of threaded fasteners 82 (also shown in FIG. 6) and threaded holes 82a to an end wall 12b of the base assembly 12. The base assembly 12 is preferably formed from a single piece of material, such as from steel or possibly from surface hardened aluminum, but it will be appreciated that this component could be formed from a wide variety of other appropriate materials.

Referring to FIG. 6, a generally circular part 84 is placed on the upper surface 12a of the base assembly 12 against the corner members 22 and 24. The part 84 is then rotated manually while the travel bar 54 of the travel assembly 16 is biased into contact with an outer surface of the part 84. The out-of-roundness of the part 84 causes the travel assembly 16 to move linearly in the direction of arrow 86. This linear movement is detected by the measurement device 18 and a numerical value is displayed on the display 34 representing the linear distance that the travel assembly 16 is moved. It will be appreciated that the measurement device 18 has a "0" control which allows the user to zero or "null" the device 18 after the travel bar 54 is initially urged into contact with the part 84, and thus before an out-of-roundness measurement is to be made. Thus, the value displayed on the display 34 represents a linear distance measurement from which the out-of-roundness of the circular part 84 can be gauged. After the measurement device is zeroed, rotation of the part 84, and more specifically its degree of out-of-roundness, causes the device to indicate values that represent the distance, plus or minus, from zero. From this, the out-of-roundness is obtained.

The apparatus 10 can be used with generally circular parts having a variety of diameters, as indicated by the circle in dashed lines in FIG. 6. It will also be appreciated that even larger diameter parts could be accommodated than that illustrated in FIG. 6 with appropriate sizing of the travel bar 54. The apparatus 10 is relatively light weight, compact, and can be used on any table or support platform.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for determining the circularity of circular parts of different diameters, said apparatus comprising:
    a base forming a planar support surface and having a corner portion into which a circular part is set on said planar support surface, a longitudinal channel formed in the planar support surface, and an elongated guide structure formed over the channel;
    a travel assembly disposed on said elongated guide structure for sliding linear movement there along, said travel assembly having a portion adapted to abut said circular part when said circular part is disposed in said corner portion of said base and a circularity measurement is to be made;
    a biasing element mounted in the channel and operatively coupled at one end to a portion of the base, and at the opposite end to the travel assembly:
    a linear distance measurement device operatively coupled to said travel assembly for providing a measurement of a degree of non-circularity of said circular part; and
    wherein when said circular part is rotated while positioned in said corner portion, a degree of non-circularity of said rotating circular part causes linear movement of said travel assembly along said elongated guide structure, said linear movement of said travel assembly being detected by said linear distance measurement device; and
    said biasing element maintaining said liner distance measuring device in constant contact with said circular part while said circular part is rotating.

2. The apparatus of claim 1, wherein said linear distance measurement device comprises a digital scale having a display for displaying a measurement value detected by said device.

3. The apparatus of claim 1, wherein said corner portion of said base comprises a 90 degree corner.

4. The apparatus of claim 1, further comprising a stop spring disposed in said base within said elongated guide structure for providing a stop to said travel assembly at one extreme position of movement of said travel assembly.

5. An apparatus for determining the circularity of circular parts of different diameters, said apparatus comprising:
    a base forming a generally planar support surface having a corner portion forming at least substantially a 90° corner into which a circular part is set, a longitudinal channel formed in the planar support surface and wherein said circular part rests on said support surface and over said channel formed therein;
    a travel assembly disposed on said channel for sliding linear movement there along, said travel assembly having a portion adapted to abut said circular part when said circular part is disposed in said corner portion of said base and a circularity measurement is to be made;
    a biasing member within said channel in said base and coupled to said travel assembly for providing a biasing force tending to constantly urge said travel assembly toward said corner portion of said base;
    a measurement device operatively coupled to said travel assembly for providing a measurement of a degree of non-circularity of said circular part; and
    wherein when said circular part is rotated while positioned in said corner portion, a degree of non-circularity of said rotating circular part causes movement of said travel assembly along said channel, said movement of said travel assembly being detected by said measurement device, and said biasing member operating to exert a constant biasing force on said circular part to maintain said circular part in said substantially 90° corner.

6. The apparatus of claim 5, wherein said measurement device comprises a digital scale.

7. The apparatus of claim 6, wherein said digital scale comprises a display for indicating a measurement value.

8. The apparatus of claim 5, wherein said channel comprises a guide rail mounted within said channel for assisting in guiding said travel assembly along said channel.

9. The apparatus of claim 5, further comprising a plate mounted on said base over said channel for assisting in guiding said travel assembly along said channel.

10. The apparatus of claim 5, wherein said travel assembly comprises:
    a generally I-beam shaped member to which a portion of said measurement device is coupled.

11. A method for measuring the circularity of circular parts, comprising:
    providing a base having a corner portion into which said circular part is positioned, said base further forming a generally planar support surface upon which said circular part rests;
    rotating said circular part while said circular part is set into said corner portion of said base and rests on said base;
    abutting a travel assembly against a portion of said circular part, wherein said travel assembly is able to move slidably, linearly along a guide structure associated with said base in response to a non-circularity of said circular part as said circular part is rotated;
    using a measurement device responsive to said linear, sliding movement of said travel assembly to detect said non-circularity of said circular part; and
    using a biasing member disposed within a channel in said base to exert a constant biasing force on said circular part to maintain said circular part in said corner portion.

12. The method of claim 11, wherein using a measurement device comprises using a digital scale having a display to display a number representative of said detected non-circularity of said part.

* * * * *